(12) United States Patent
Garotta

(10) Patent No.: US 7,436,735 B2
(45) Date of Patent: Oct. 14, 2008

(54) METHOD FOR SEISMIC PROCESSING, IN PARTICULAR FOR COMPENSATING BIREFRINGENCE ON SEISMIC TRACES

(75) Inventor: Robert Garotta, Gonfaron (FR)

(73) Assignee: Compagnie Generale de Geophysique, Massy (FR)

( * ) Notice: Subject to any disclaimer, the term of this patent is extended or adjusted under 35 U.S.C. 154(b) by 364 days.

(21) Appl. No.: 10/495,241

(22) PCT Filed: Nov. 7, 2002

(86) PCT No.: PCT/FR02/03821

§ 371 (c)(1),
(2), (4) Date: May 7, 2004

(87) PCT Pub. No.: WO03/040758

PCT Pub. Date: May 15, 2003

(65) Prior Publication Data

US 2005/0013195 A1 Jan. 20, 2005

(30) Foreign Application Priority Data

Nov. 8, 2001 (FR) .................... 01 14440

(51) Int. Cl.
*G01V 1/28* (2006.01)
*G01V 1/32* (2006.01)
(52) U.S. Cl. ..................... 367/75; 367/38; 367/50; 702/14
(58) Field of Classification Search ............... 367/38, 367/50, 75, 31; 702/14
See application file for complete search history.

(56) References Cited

U.S. PATENT DOCUMENTS

| | | | |
|---|---|---|---|
| 3,638,177 A | 1/1972 | Lindblade et al. | |
| 3,668,620 A | 6/1972 | Mathieu et al. | |
| 3,713,084 A | 1/1973 | Mayne et al. | |
| 3,714,621 A | 1/1973 | Waters | |
| 3,786,409 A | 1/1974 | Sorkin | |
| 3,882,446 A | 5/1975 | Brittian et al. | |
| 4,422,165 A * | 12/1983 | Thomas et al. | ................ 367/40 |
| 4,460,059 A | 7/1984 | Katz | |
| 4,564,927 A | 1/1986 | Kolb | |
| 4,570,246 A | 2/1986 | Herkenhof | |
| 4,594,691 A | 6/1986 | Kimball | |
| 4,633,400 A | 12/1986 | Chittineni | |
| 4,679,174 A | 7/1987 | Gelfand | |

(Continued)

OTHER PUBLICATIONS

Stewart, et al. "Converted-wave seismic exploration: applications." Crewes Research Report, vol. 12, 2000.*

(Continued)

*Primary Examiner*—Jack W Keith
*Assistant Examiner*—Scott A Hughes
(74) *Attorney, Agent, or Firm*—Blakely, Sokoloff, Taylor & Zafman LLP

(57) ABSTRACT

A method of seismic processing for obtaining information on the geophysics of the subsoil includes acquiring seismic traces at at least one point on the surface of the subsoil or in the subsoil, the seismic traces corresponding on each occasion to two perpendicular components of a shear wave emitted into the subsoil and reflected by different interfaces therein; applying a succession of transformations ($\perp$) at least to a temporal portion of the traces for each of these assumptions, determining the value of a parameter representative of the coherence/similarity between the result traces obtained in this way; and election as a function of the values obtained in this way that one of the hypotheses which is considered as being most representative of the subsoil, the two result traces obtained for said hypothesis being compensated traces of the subsoil birefringency.

12 Claims, 2 Drawing Sheets

U.S. PATENT DOCUMENTS

| | | | |
|---|---|---|---|
| 4,706,225 | A | 11/1987 | Raoult |
| 4,779,237 | A | 10/1988 | Bodine |
| 4,785,196 | A | 11/1988 | Reed |
| 4,789,969 | A * | 12/1988 | Naville ............ 367/36 |
| 4,933,913 | A * | 6/1990 | Thomsen ............ 367/75 |
| 4,947,381 | A * | 8/1990 | McCormack ............ 367/75 |
| 4,954,998 | A | 9/1990 | Rector |
| 5,060,204 | A * | 10/1991 | Winterstein ............ 367/75 |
| 5,136,554 | A * | 8/1992 | Thomsen et al. ............ 367/75 |
| 5,214,613 | A * | 5/1993 | Esmersoy ............ 367/31 |
| 5,343,441 | A * | 8/1994 | Alford ............ 367/75 |
| 5,610,875 | A * | 3/1997 | Gaiser ............ 367/75 |
| 5,724,309 | A | 3/1998 | Higgs |
| 5,831,935 | A | 11/1998 | Luo |
| 5,835,452 | A * | 11/1998 | Mueller et al. ............ 367/75 |
| 5,838,564 | A | 11/1998 | Bahorich |
| 5,884,229 | A | 3/1999 | Matteucci |
| 5,930,730 | A | 7/1999 | Marfurt |
| 5,940,778 | A | 8/1999 | Marfurt |
| 5,986,974 | A | 11/1999 | Luo |
| 5,999,486 | A * | 12/1999 | DeVault ............ 367/36 |
| 6,027,447 | A | 2/2000 | Li |
| 6,055,482 | A | 4/2000 | Sudhakar et al. |
| 6,120,450 | A | 9/2000 | Li |
| 6,128,580 | A * | 10/2000 | Thomsen ............ 702/18 |
| 6,131,071 | A | 10/2000 | Partyka |
| 6,138,075 | A | 10/2000 | Yost |
| 6,141,622 | A | 10/2000 | Keller |
| 6,160,758 | A | 12/2000 | Spiesberger |
| 6,304,675 | B1 | 10/2001 | Osbourn |
| 6,317,384 | B1 | 11/2001 | Luo |
| 6,529,445 | B1 | 3/2003 | Laws |
| 6,556,921 | B1 * | 4/2003 | Hardage et al. ............ 702/14 |
| 6,594,585 | B1 | 7/2003 | Gersztenkorn |
| 6,597,994 | B2 | 7/2003 | Meek |
| RE38,229 | E | 8/2003 | Marfurt et al. |
| 6,625,542 | B1 * | 9/2003 | Hardage et al. ............ 367/75 |
| 6,631,327 | B2 | 10/2003 | Hsu |
| 6,639,871 | B1 * | 10/2003 | Garotta et al. ............ 367/75 |
| 6,651,006 | B1 | 11/2003 | Trappe |
| 6,724,319 | B1 | 4/2004 | Knaack |
| 6,725,174 | B2 | 4/2004 | Bouts |
| 6,728,165 | B1 | 4/2004 | Roscigno |
| 6,754,587 | B1 | 6/2004 | Trappe |
| 6,775,618 | B1 | 8/2004 | Robertsson |
| 6,826,485 | B1 * | 11/2004 | Bale et al. ............ 702/14 |
| 6,911,931 | B2 | 6/2005 | Vincent |
| 6,961,673 | B2 | 11/2005 | Barnes |
| 6,961,700 | B2 | 11/2005 | Mitchell |
| 6,988,038 | B2 | 1/2006 | Trappe |
| 7,020,558 | B2 | 3/2006 | Voutay et al. |
| 7,026,819 | B2 | 4/2006 | Eidesmo |
| 7,057,741 | B1 | 6/2006 | Mueller |
| 7,069,149 | B2 | 6/2006 | Goff |
| 7,173,715 | B2 | 2/2007 | Mueller |
| 7,196,634 | B2 | 3/2007 | Cherry |
| 7,257,489 | B2 | 8/2007 | Hsu |
| 7,274,332 | B1 | 9/2007 | Dupray |
| 7,277,758 | B2 | 10/2007 | DiLorenzo |
| 7,280,952 | B2 | 10/2007 | Butler |
| 7,324,851 | B1 | 1/2008 | DiLorenzo |

OTHER PUBLICATIONS

Lefeuvre, et al. "Detection and measure of the shear-wave birefringence from vertical seismic data: Theory and applications." Geophysics, Nov. 1992.*

Zeng, et al. "Algebraic processing techniques for estimating shear-wave splitting in near-offset VSP data: Theory." Geophysical Prospecting, 1993.*

Li, et al. "Complex component analysis of shear-wave splitting: theory." Geophys J Int V 107, No. 3, pp. 597-604, Dec. 1991.*

Shieh, Chiou-Fen. "Estimation of shear-wave splitting time using orthogonal transformation." Geophysics, 1997.*

Spitz, Simon. "Seismic analysis with multi-components." CSEG Recorder, Sep. 2001.*

Simmons, et al. "Shear-wave splitting: Tutorial issues and implications for 9-C 3-D seismic reflection data." SEG 1999 Expanded Abstracts.*

Simmons, et al. "Radial-Transverse (SV-SH) Coordinates for 9-C 3-D Seismic Reflection Data Analysis." SEG 1999 Expanded Abstracts.*

Li, et al. "Interpreting data matrix asymmetrt and polarization changes with depth in multcomponent reflection surveys." SEG 1995.*

Dai, et al. "Interpreting residual wavefields for polarization change in a 4-C shear-wave data matrix." SEG 1998.*

* cited by examiner

METHOD FOR SEISMIC PROCESSING, IN PARTICULAR FOR COMPENSATING BIREFRINGENCE ON SEISMIC TRACES

The present patent application is a non-provisional application of International Application No. PCT/FR02/03821, filed Nov. 7, 2002.

BACKGROUND

1 Field

The invention relates to the field of geophysics.

More particularly, it provides a method of compensating birefringence in reflection seismic surveying.

2 Description Of The Related Art

Birefringence occurs each time a shear wave passes through an elastic domain that is affected by azimuthal anisotropy: the vibrations are then resolved along two perpendicular axes of anisotropy, with vibration S1 and vibration S2 on said two axes propagating at different speeds.

Each time a shear wave that was initially polarized with the polarization of one layer passes through a birefringent layer it becomes projected on the two polarization directions of the new layer.

In this way, the number of components in a signal is multiplied by two each time it passes through a layer having birefringent characteristics that differ from those of the preceding layer.

After passing through a plurality of such birefringent layers, the initial wave S is replaced by two sequences of waves, each polarized on the anisotropy axis of the last medium to be passed through, with each of these sequences comprising a sum of $2^{n-1}$ components, where $n$ is the number of layer interfaces through which the wave has passed.

Thus, on leaving the last layer, a set of signal components is obtained in a first polarization together with a set of signal components in the second polarization.

In seismic applications, birefringency presents two opposing aspects.

It presents a positive aspect since it is theoretically possible to perform inversion for each layer and obtain the orientation of the anisotropy axes and the delay between slow propagation and fast propagation, and these parameters are of interest in exploring for oil (characterizing fractures).

It also presents a negative aspect since the complexity of the resulting sequence of $2^n$ waves recorded by the seismic sensors confuses the final message. Birefringence needs to be inverted by calculation to recover the full potential of the exploration.

In the specification below, "dn" represents, for each layer $n$ passed through, the time delay introduced between slow propagation S2 and fast propagation S1 (where $n$ is an integer number corresponding to an index for the layers); "an" corresponds to the angle that exists between the fast axis of the layer n−1 and the fast axis of the layer $n$.

Algorithms are already known that make it possible to look for the parameters $a$ and $d$ relating to passing through a single layer.

These parameters $a$ and $d$ are generally calculated for trace portions having a duration of about 100 milliseconds (ms) (R. M. Alford, 1986, "Shear data in the presence of azimuthal anisotropy" SEG exp. abs., pp. 476-479; H. B. Lynn and Thomsen, 1990, "Reflection shear wave data collected near the principal axes of azimuthal anisotropy" Geophysics 55 (2), 147; L. A. Thomsen, I. Tsvankin, M. C. Mueller, 1995 "Layer stripping of azimuthal anisotropy from reflection shear wave data" SEG exp. abs., pp. 289-292; R. J. Garotta, "Detection of azimuthal anisotropy" 1989, SEG exp. abs., pp. 861-863).

SUMMARY

It will be understood that known methods are limited and do not give satisfaction since they do not make it possible to obtain the desired parameters quickly and in reliable manner.

In particular, they do not enable birefringence parameters to be calculated over a large number of layers.

An object of the invention is to solve those drawbacks and to propose a method that is effective in determining the parameters of a plurality of birefringent layers in the subsoil.

To this end the invention provides a method of seismic processing for the purpose of obtaining information about the geophysics of the subsoil, the method comprising the following steps:

a) acquiring seismic traces at at least one point on the surface of the subsoil or in the subsoil, the seismic traces corresponding on each occasion to two perpendicular components of a shear wave emitted into the subsoil and reflected by different interfaces therein;

b) applying a succession of transformations ($\perp$) at least to a temporal portion of the traces, which transformations are the inverses of the transformations that it is assumed that the wave has encountered on passing through a succession of layers in the subsoil, this operation being repeated for different assumptions concerning birefringence in the various layers;

c) for each of these assumptions, determining the value of a parameter representative of the coherence/similarity between the result traces obtained in this way.

Other characteristics, objects, and advantages of the invention appear on reading the following detailed description with reference to the accompanying figure which is a vertical section through subsoil comprising a plurality of birefringent layers.

DETAILED DESCRIPTION

Figure 1:
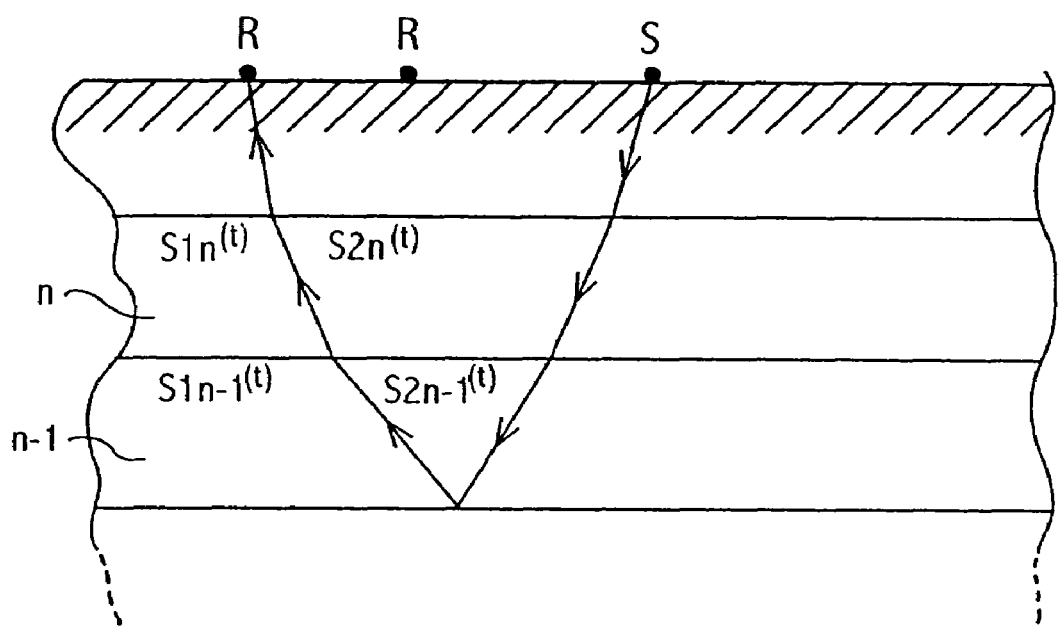
FIG. 1 shows a shear wave emitted at the surface from a source S, together with a plurality of receivers R distributed on the surface in order to pick up the waves reflected at the various interfaces between the various layers of the subsoil.
Figure 2:
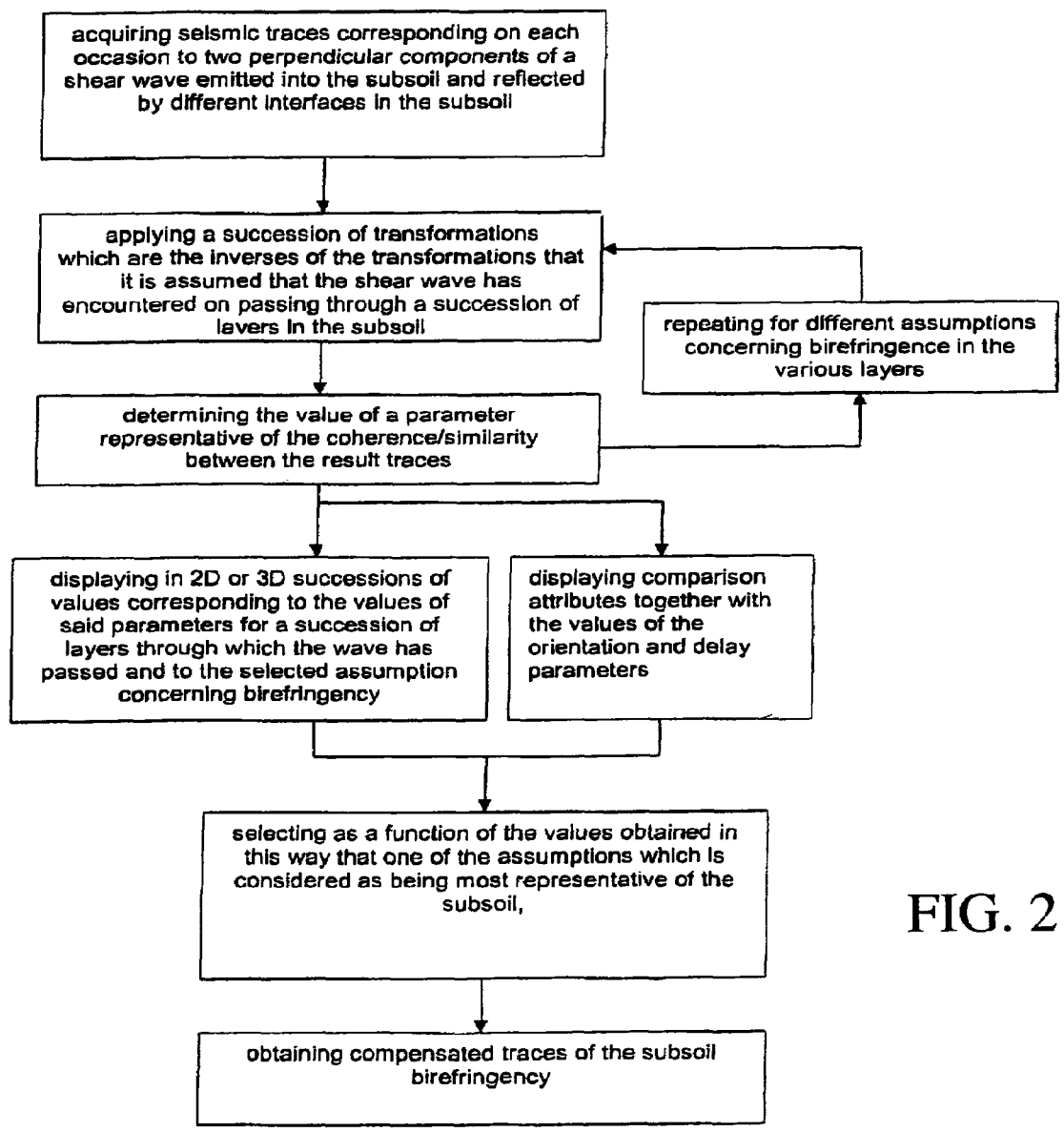
FIG. 2 illustrates a block diagram of a method of an embodiment.

When considering a given layer $n$ which is assumed to be birefringent, the shear wave passing through said layer resolves along the two anisotropy axis of said layer into two shear components S1n and S2n.

The operation $\perp_n$ which relates the shear components of the wave on leaving said layer $n$ to the components S1n−1 and S2n−1 of said wave along the two anisotropy axes of the preceding layer, can be defined in the form of a matrix, e.g. in the following form:

$$\begin{bmatrix} S1n(t) \\ S2n(t) \end{bmatrix} = \begin{bmatrix} \cos(an)S1n-1(t) + \sin(an)S2n-1(t+dn) \\ -\sin(an)S1n-1(t) + \cos(an)S2n-1(t+dn) \end{bmatrix} \quad (1)$$

where $t$ is a silent variable representing propagation time.

This operation may also be written:

Sn=Sn−1 $\perp_n$ and defines the passage of wave S (S1 and S2) through the layer with index number $\underline{n}$.

In mathematical terms, the pairs (S1n, S2n) constitute a set on which the transformation $\perp_n$ defines a non-Abelian group, $\perp_n$ itself being defined by the pair (an, dn).

The neutral element corresponds to (an=0, dn=0), and represents a layer that is not birefringent.

Any element (ai, di) has an inverse (−ai, −di). It can easily be verified that:

(ai, di)⊥(−ai, −di)=neutral element.

The operation is associative.

The operation is not commutative: the final polarizations are defined by the natural orientation of the last layer through which the wave has passed.

A sequence of $\underline{n}$operations (ai, di) provides the image of a pair of seismic traces recorded after passing through $\underline{n}$layers.

When considering a pair of traces (T1, T2) picked up at the surface by a given receiver R, it is theoretically possible by virtue of the above-described group structure to define the sequence of pairs (ai, di) which corresponds to the pair of traces.

It is proposed to search for the sequence of pairs (−ai, −di) by means of non-linear optimization such that when applied to the traces T1, T2 they return to the "original" traces S1 and S2, where S1 corresponds to the result of propagating through layers in which the speed is always the fast speeds of the birefringent media, and where S2 is the result of propagation corresponding always to the slow speeds.

These two theoretical traces S1, S2 are identical, ignoring time delay.

It is therefore proposed to search for the sequence of pairs (−ai, −di) for which the inverse traces S1, S2 are the most correlated.

It is assumed that the traces were acquired at time intervals of the order of 100 milliseconds or greater, for example.

Two portions of traces T1 and T2 corresponding to such a time interval are sampled with a sampling period which is of the order of 2 or 4 milliseconds.

The inverse operation ⊥ is applied in cascade to these trace portions using the index $\underline{i}$and adopting a series of assumed pairs (−ai, −di).

This produces a succession of sample pairs which define the pair of traces to be compared.

A "cost" function is calculated on this pair of traces, which function is based on the resemblance or similarity of the traces of the pair produced by the cascade of transformations.

By way of example, this cost function is a cross-correlation function, however it could be constituted more generally by any function serving to quantify coherence between two portions of traces.

This function is calculated for a plurality of successions of pairs (ai, di), which are nevertheless selected so as to approach optimization of the pairs (ai, di) (e.g. by implementing a Monte Carlo method).

Naturally, the parameters ai and di are selected to have values that make sense physically.

Thus, the angle ai is selected to lie in the range −90° to +90°, and the time offset di is selected to lie in the range −20% to +20% of the time taken to pass through the layer $\underline{i}$under consideration, or over the range −15% to +15%.

Numerous processes can be envisaged for determining from the cost functions which succession of pairs (ai, di) is the succession that optimizes similarity between the traces that are obtained.

In a first variant implementation, the cost function value obtained in this way is compared with a given threshold and it is considered that the resulting traces are similar and that the sequence of pairs (ai, di) for which this value is obtained is the desired sequence, when the cost function becomes less than (or greater than) the threshold with which it is compared.

The portions of traces S1 and S2 then obtained constitute blocks of terms from which the anisotropy has been eliminated. They reflect the geometrical complexity of the dispositions of the layers and they are used for studying the disposition and the behavior parameters of said layers.

In another variant, it is considered that optimum resemblance is achieved when the cost function stagnates, i.e. when it varies only by amounts that are below a given threshold.

In order to identify such stagnation, the value of the cost function calculated at the last iteration is compared with one or more values of the cost function as obtained beforehand. It is determined whether this most recently obtained value lies within a given proximity range relative to the previously obtained cost(s).

In yet another variant, calculations are reiterated with a plurality of successions of pairs (ai, di), the cost values obtained by such calculations are compared with one another, and the succession of pairs (ai, di) producing a cost value that corresponds to the best similarity between the two result traces from amongst the various calculations is adopted as the succession of orientation change and time offset pairs that is effective for the layers.

As will have been understood, whatever optimization method is used, when surveying the subsoil in three dimensions, the practical result is a block of results in three dimensions expressing for each instant in question and for each surface position, the local orientation of the various fast axes traveled along in succession (sequence of parameters ai) and the succession of delays between the fast orientation and the slow orientation (sequence of parameters di).

The cube obtained in this way can be associated with the traces S1 and S2, and with the comparison attributes between S1 and S2: amplitudes, spectral content, etc. . . . .

This leads to a dense cube of anisotropy attributes.

It is possible to associate this cube with a picture which can be displayed on a screen or printed.

The invention claimed is:

1. A method of seismic processing for obtaining information on the geophysics of subsoil, the method comprising:

acquiring seismic traces at at least one point on the surface of the subsoil, the seismic traces corresponding on each occasion to two perpendicular components of a shear wave emitted into the subsoil and reflected by different interfaces therein;

applying a succession of inverse transformations (⊥) at least to a temporal portion of the seismic traces to obtain result traces, the inverse transformations to restore transformations that it is assumed that the shear wave has encountered on passing through a succession of layers in the subsoil, the layers being analyzed as a whole, and an operation of applying the succession of inverse transformations being repeated for different assumptions concerning birefringence in the layers;

for each of these assumptions, determining a value of a parameter representative of the coherence/similarity between the result traces; and selecting as a function of the values obtained in this way that one of the assumptions which is considered as being most representative of the subsoil, two final result traces obtained for said assumption being compensated for the subsoil birefringency, wherein the two final result traces are obtained by analyzing the layers as a whole.

2. The method according to claim 1, wherein an assumption concerning the birefringency of a layer is characterized by at least one parameter relating to the orientation of the birefringency axes and by at least one parameter relating to the delay imparted by said layer between propagation oriented on a fast axis and propagation oriented on a slow axis, and in that the results are represented or displayed in two dimensions or in three dimensions with, for different portions of the traces, successions of values corresponding to the values of said parameters for a succession of layers through which the wave has passed and to the selected assumption concerning birefringency.

3. The method according to claim 2, wherein comparison attributes are determined on the result traces and represented or displayed together with the values of the orientation and delay parameters.

4. The method according to claim 1, wherein in order to select a birefringency assumption that is considered as being the most representative, the value of the parameter representing coherence/similarity of the result traces obtained for each assumption is compared with a threshold value.

5. The method according to claim 1, wherein successive iterations are performed during which a new birefringency assumption is selected for each operation as a function of the value calculated at the preceding iteration for the parameter representative of coherence/similarity between the result traces obtained, and in that in order to select the birefringency assumption that is considered as being the most representative, it is determined whether the value obtained for the parameter representative of coherence/similarity between the result traces at the iteration in question lies within a given proximity range relative to the values obtained for the same parameter during preceding iterations.

6. The method according to claim 1, wherein it is implemented on trace portions having a duration of the order of 100 milliseconds or longer.

7. The method according to claim 6, wherein trace portions are sampled with a sampling time of the order of 2 or 4 milliseconds or shorter, each of sampling intervals or groups of successive intervals corresponding to a layer under study.

8. A seismic processing method for revealing fractures in subsoil, comprising:
acquiring seismic traces at at least one point on the surface of the subsoil, the seismic traces corresponding on each occasion to two perpendicular components of a shear wave emitted into the subsoil and reflected by different interfaces therein;
applying a succession of inverse transformations ($\perp$) at least to a temporal portion of the traces to obtain result traces, the inverse transformations to restore transformations that it is assumed that the shear wave has encountered on passing through a succession of layers in the subsoil, the layers being analyzed as a whole, and an operation of applying the succession of inverse transformations being repeated for different assumptions concerning birefringence in the layers;
for each of these assumptions, determining a value of a parameter representative of the coherence/similarity between the result traces obtained; and
selecting as a function of the values obtained in this way that one of the assumptions which is considered as being most representative of the subsoil, two final result traces obtained for said assumption being compensated for the subsoil birefringency, wherein the two final result traces are obtained by analyzing the layers as a whole.

9. A method for obtaining information on the geophysics of subsoil, the method comprising:
acquiring seismic traces at least one point on the surface of the subsoil, the seismic traces corresponding on each occasion to two perpendicular components of a shear wave emitted into the subsoil and reflected by different interfaces therein;
applying a succession of inverse transformations ($\perp$) at least to a temporal portion of the traces to obtain result traces, the inverse transformations to restore the transformations that it is assumed that the shear wave has encountered on passing through a succession of layers in the subsoil, the layers being analyzed as a whole, and an operation of applying the succession of inverse transformations being repeated for different assumptions concerning birefringence in the layers;
for each of these assumptions, determining a value of a parameter representative of the coherence/similarity between the result traces.

10. A method of seismic processing for obtaining information on the geophysics of subsoil, the method comprising
a) acquiring a pair of seismic traces at at least one point of the surface of the subsoil, said seismic traces corresponding to two perpendicular components of a shear wave emitted in the subsoil and reflected by different interfaces corresponding to a plurality of successive layers therein,
b) choosing a first succession of sets of birefringence parameters which characterize a succession of birefringence transformations that it is assumed that the shear wave has encountered on passing through said plurality of successive layers,
c) applying at least to a temporal portion of said two traces corresponding to two perpendicular components of the shear wave, a succession of transformations which are the inverses of said succession of birefringence transformations that it is assumed that the shear wave has encountered on passing through said plurality of successive layers,
d) calculating on the pair of results traces thus obtained a cost function value which is based on the coherency/similarity of said results traces,
e) repeating steps c) and d) for other succession of sets of birefringence parameters corresponding to other assumptions concerning birefringence of the plurality of successive layers,
f) selecting, as a function of the cost function value calculated, the succession of sets of birefringence parameters which optimizes the coherency/similarity between the result traces obtained.

11. A method according to claim 10, wherein a cost function from which the cost function value is calculated is a cross-correlation function.

12. A method according to claim 10, wherein a set of birefringence parameters comprises:
at least one parameter relating to the orientation of the birefringence axes, and
at least one parameter relating to the delay imparted by said layer between propagation orientated on a fast axis and propagation orientated on a slow axis.

* * * * *